E. T. PARSONS & W. J. O'NEIL.
MACHINE FOR MOLDING PLASTIC MATERIAL.
APPLICATION FILED JULY 17, 1906.
953,177.
Patented Mar. 29, 1910.
6 SHEETS—SHEET 4.
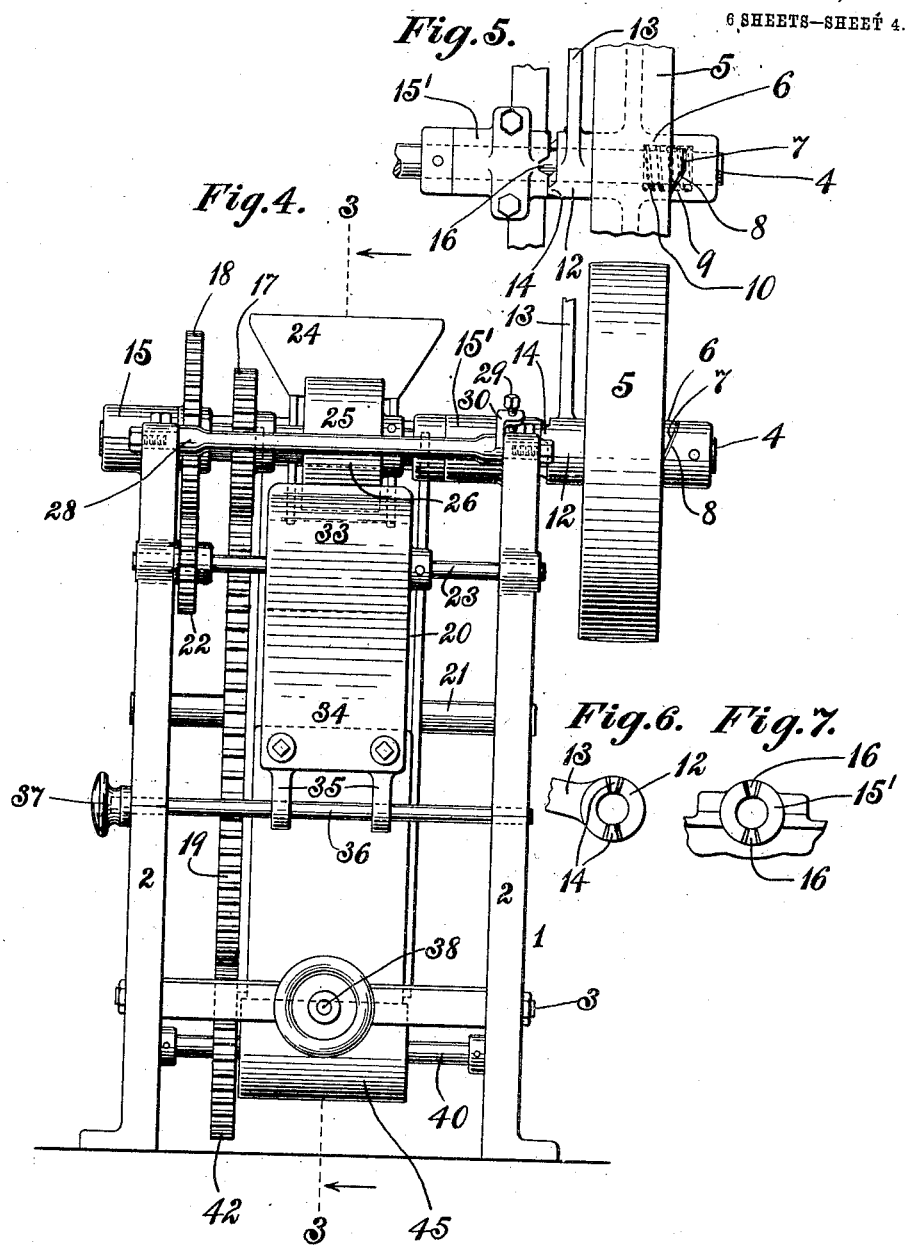
Witnesses:
Chas. D. King
F. E. Anderson
Inventors:
E. T. Parsons
W. J. O'Neil
by
Atty.

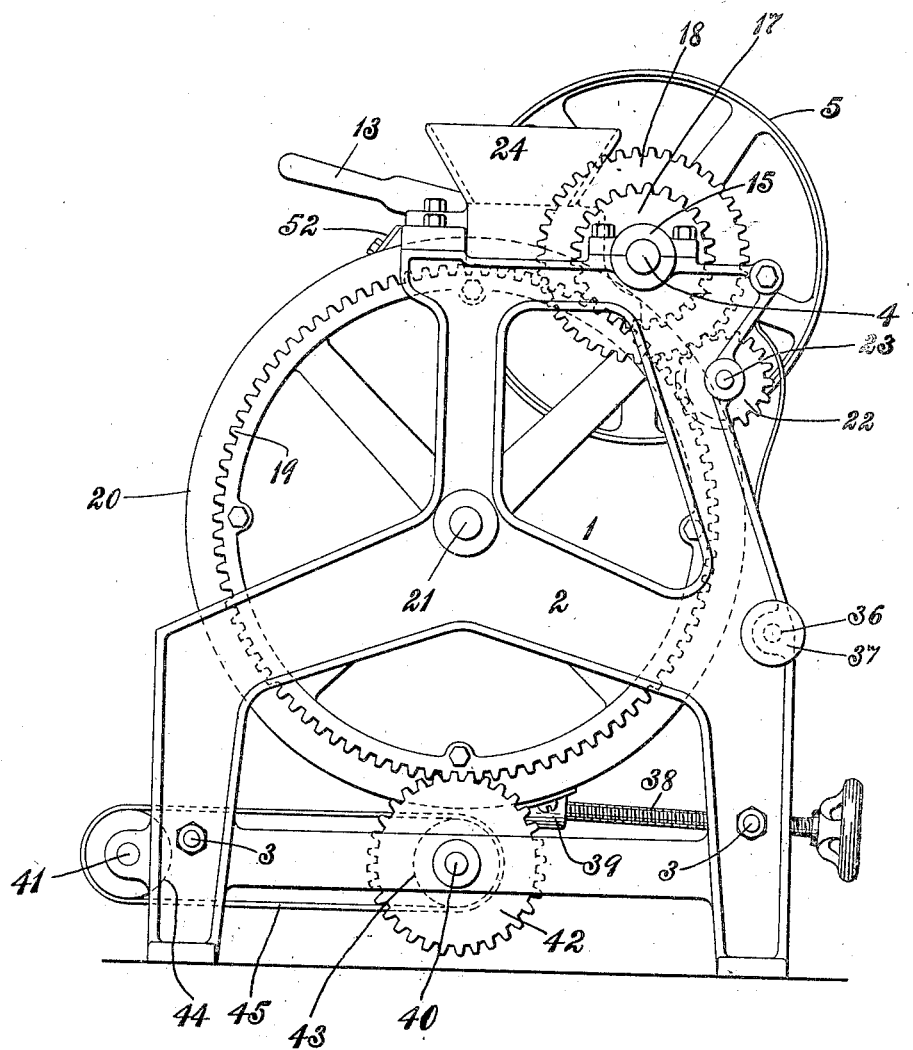

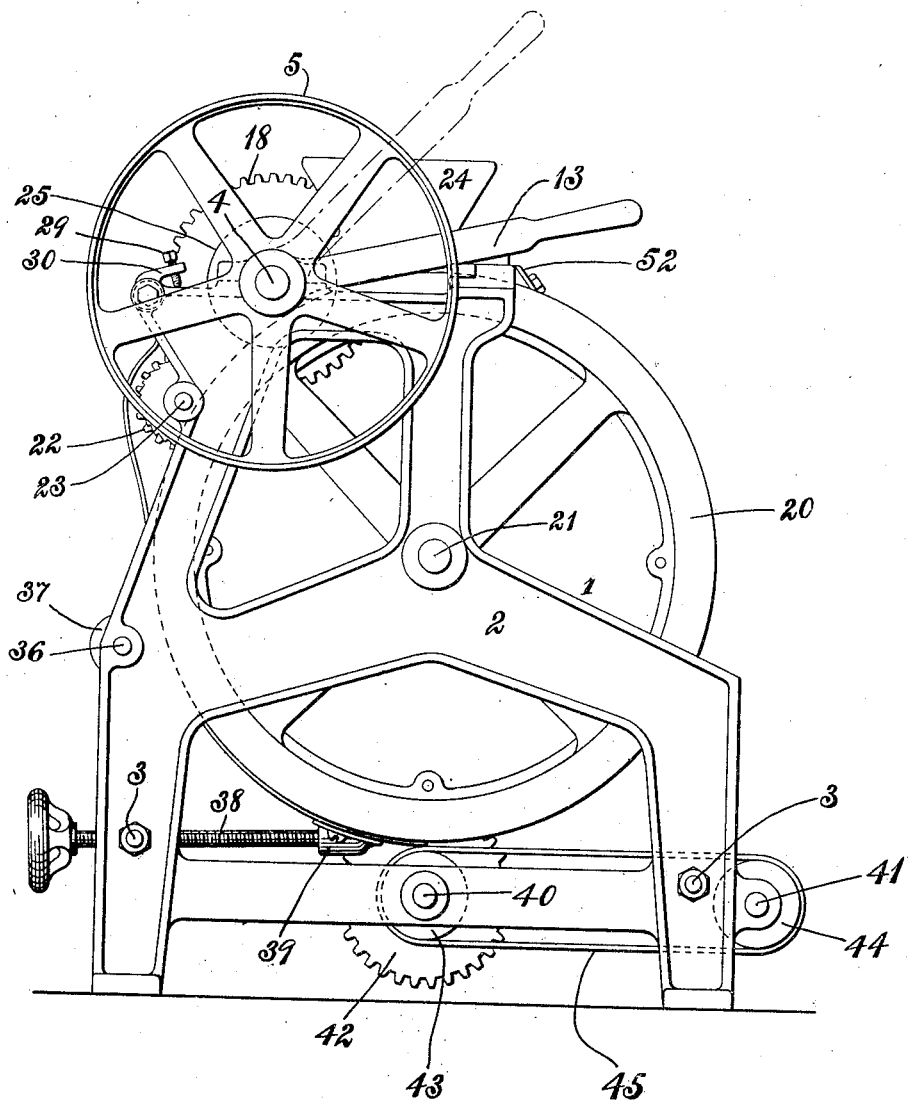

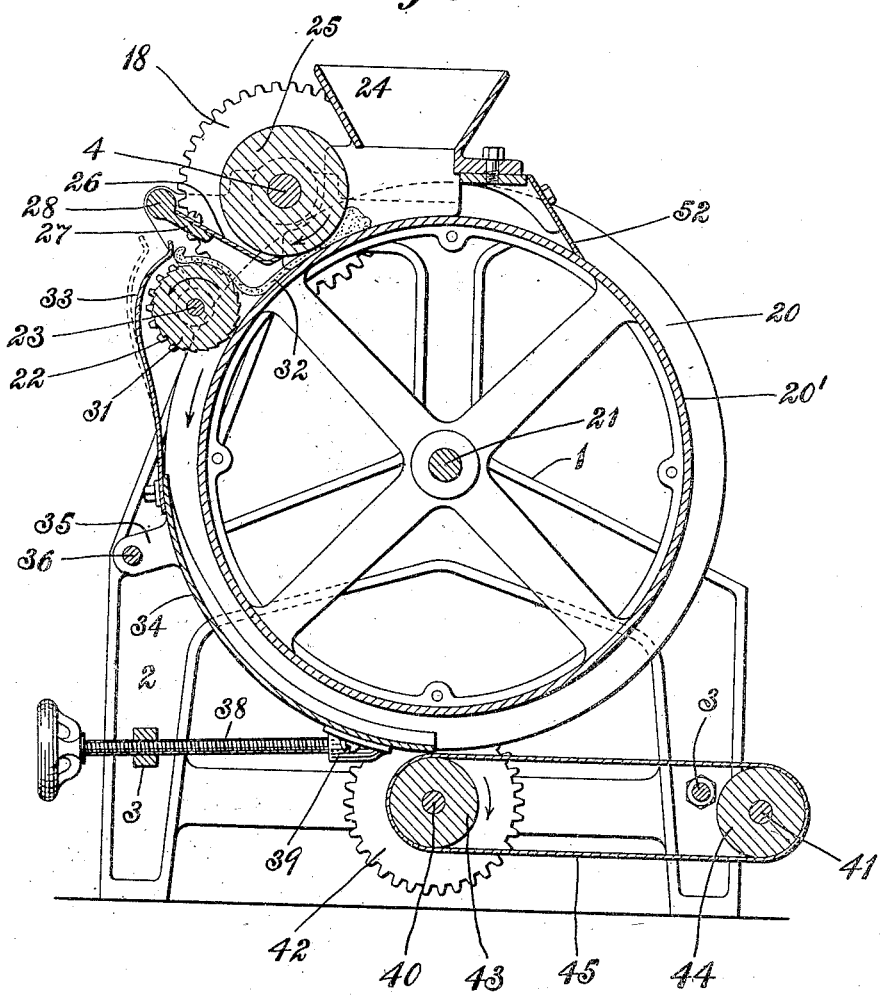

E. T. PARSONS & W. J. O'NEIL.
MACHINE FOR MOLDING PLASTIC MATERIAL.
APPLICATION FILED JULY 17, 1906.
953,177.
Patented Mar. 29, 1910.
6 SHEETS—SHEET 5.
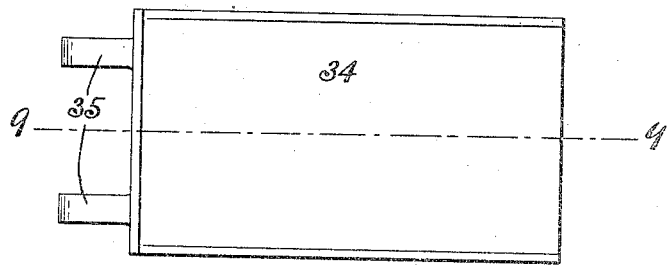
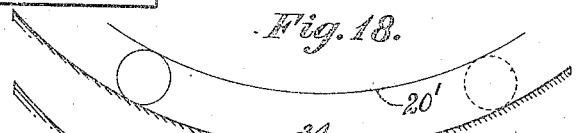
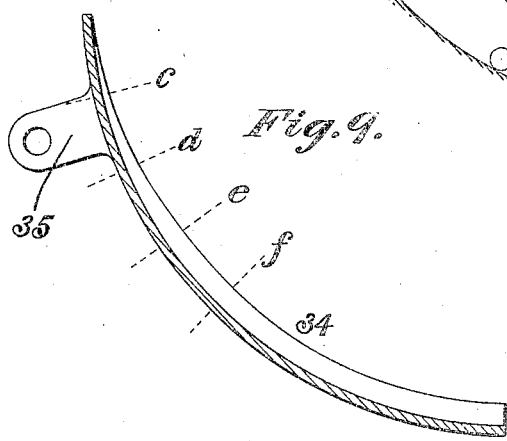
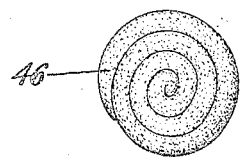
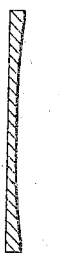 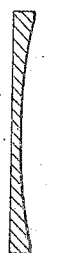 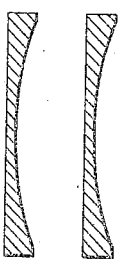 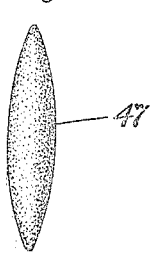 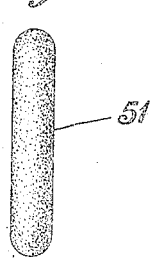
Fig.10.  Fig.12.    Fig.14.    Fig.16.
Fig.11.  Fig.13.
Witnesses:
Chas. D. King.
F. E. Anderson.
Inventors:
E. T. Parsons
W. J. O'Neil
by
Atty.

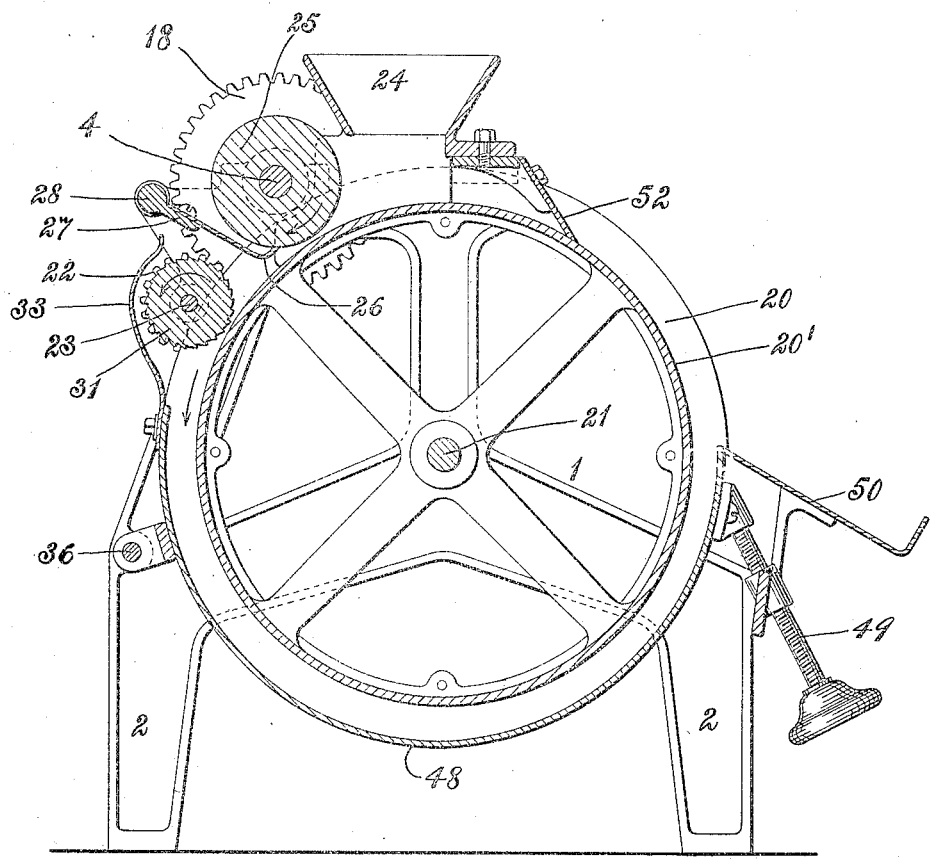

UNITED STATES PATENT OFFICE.

EDWARD T. PARSONS AND WILLIAM J. O'NEIL, OF NEWARK, NEW JERSEY, ASSIGNORS TO C. A. THOMPSON MACHINE COMPANY, OF BELLEVILLE, NEW JERSEY, A CORPORATION OF NEW JERSEY.

MACHINE FOR MOLDING PLASTIC MATERIAL.

953,177.  Specification of Letters Patent.  Patented Mar. 29, 1910.

Application filed July 17, 1906. Serial No. 326,588.

*To all whom it may concern:*

Be it known that we, EDWARD T. PARSONS and WILLIAM J. O'NEIL, citizens of the United States, residing at Newark, in the county of Essex and State of New Jersey, have jointly invented certain new and useful Improvements in Machines for Molding Plastic Material, of which the following is a specification.

This invention relates to machines for molding plastic material, and more particularly to apparatus for forming dough into the form of loaves or batches ready for the oven.

A further object of the invention is the provision of means for molding dough into loaves of varying diameter and of any required size, so that what are known to the trade as Vienna loaves may be readily made by machinery.

A further object of the invention is the provision of improved means for forming a batch or lump of dough into a flat sheet, and in connection therewith of curling and conveying devices for starting said sheet into the form of a coil or spiral.

A further object of the invention is the provision of a molding-plate or concave of peculiar form, said plate coöperating with a drum, roller or other device by which the coil is rolled or kneaded into loaf-form.

Other objects of the invention will be hereinafter set forth.

In the accompanying drawings, Figure 1 is a side elevation of the preferred form of our invention, or as it is used for making tapered rolls or "Vienna" loaves. Fig. 2 is a side elevation of the side of the machine reverse to that of Fig. 1. Fig. 3 is a longitudinal vertical section taken on line 3—3 of Fig. 4. Fig. 4 is a front elevation. Fig. 5 is a detail view showing in plan a clutch and part of a pulley which may be employed. Figs. 6 and 7 are end views of a pair of clutch-members. Fig. 8 is a plan view of the forming-plate or concave. Fig. 9 is a longitudinal vertical section taken on line 9—9 of Fig. 8. Figs. 10 to 13 inclusive are sections taken, respectively, on lines c, d, e and f of Fig. 9. Fig. 14 is a view of a tapered or Vienna roll, as formed by the machine in its preferred form. Fig. 15 is an end view of the coil of dough utilized in both forms of the invention. Fig. 16 is a view of a straight cylindrical roll or loaf; Fig. 17 is a sectional view corresponding to Fig. 3 but having a plate or concave for producing the roll shown in Fig. 16; and Figs. 18 and 19 are diagrams hereinafter described.

Like numerals designate similar parts throughout the several views.

Referring to the drawings, the numeral 1 designates the frame of the machine, shown composed of sides 2 united by tie-rods 3, although it may be of other suitable construction. Journaled in the top of the frame is a driving-shaft 4, and on said shaft is loosely mounted a belt-pulley 5, having a hub 6 provided with a clutch-face 7, while rigid with the shaft is a complemental clutch-surface 8 chambered at 9 to receive a coiled-spring 10 surrounding the shaft 4. Sleeved upon the shaft 4 adjacent to the inner side of pulley 5 is the hub 12 of a lever 13, said hub having on its inner side a pair of diametrically-opposite teeth 14.

Rigid with the side-frames 2 are boxes 15, 15′ in which the shaft 4 is journaled, and in the end of the journal-box 15′ are formed notches 16 for the reception of the teeth 14, (see Figs. 5, 6 and 7).

From what has been stated it will be evident that when the lever 13 is manipulated the teeth 14 on the hub thereof will ride out of the notches in the end of the bearing 15′, shift the pulley 5 by a camming-action longitudinally of the shaft, and cause said pulley to be clutched to said shaft, and that when the teeth 14 are forced within said notches 16 by the spring 10 the pulley will idly rotate. Any other clutch construction may, however, be substituted for that shown without departure from the invention.

Rigid with the shaft 4 are gears 17 and 18, the former intermeshing with a large gear 19 secured to the side of a drum 20 carried by a shaft 21 journaled in bearings of the side-frames, and the latter with a pinion 22 carried by a shaft 23 also journaled in said side-frames. To the top of the frame is secured a hopper 24 in which the dough to be molded is placed, and carried by the shaft 4 is a roll 25 coöperating with the periphery of the drum to reduce the mass of dough to sheet-form, as illustrated in Fig. 3. A stripper-plate 26 is secured to an arm 27 projecting from a rock-shaft 28 journaled in bearings of the frame, said stripper-plate serving to clear the roll from adhering material in the usual manner. A screw 29 passes through an arm 30 of the rock-shaft 28, bears against the top of one of the side-frames and serves to adjust the rock-shaft and stripper-plate.

Rigid with the shaft 23 is a toothed or serrated roll 31, rotating in the direction of the arrow shown in Figs. 3 and 4, and serving to engage the sheet 32 of plastic-material and to carry it upward until its end engages a curved resilient curler-plate 33 bolted or otherwise secured to a concave 34 of peculiar construction,—said concave having ears 35 sleeved upon a removable rod 36, provided with a knob 37, and connecting the side-frames of the machine. A hand-screw 38 is swiveled at its inner end in a block 39 secured to the concave and is in threaded engagement with the lower rocking-cross-rod 3, said screw serving to adjust the concave toward and from the working periphery of the drum 20, so that the space between said drum and said concave may be regulated to suit the diameter of roll or loaf to be made. Shafts 40 and 41 are journaled in the frame, the former carrying a gear 42 in mesh with the large gear 19 of the drum, and both shafts having rollers 43 and 44, respectively, over which passes an endless conveyer-belt 45.

Coming now to the main feature of the invention—i. e. the means for forming the dough into a tapered or "Vienna" shaped loaf, attention is particularly directed to Figs. 9 to 14 inclusive, to the fact that the curling-devices have brought the sheet of dough into the coiled or incipient loaf-form 46 illustrated in Fig. 15; and to the further fact that said coil of dough is to be rolled or kneaded between the open-sided concave or former-plate 34 and the periphery 20' of the drum 20 into the perfected shape indicated by the numeral 47 in said Fig. 14.

It will, of course be understood that the concave or former-plate 34 is to be adjusted by screw 38 or otherwise to suit the diameter of the product to be produced and that the machine may be made of any size, or as it stands be capable of such adjustment that any required diameter of roll or loaf may be made. Gradually to bring the coil 46 into the shape required the concave depression of the former-plate 34 which is flangeless at the edges to permit free elongation of the coil progressively increases in thickness or taper at the edges from its upper to its lower end, this formation being clearly illustrated in the various sectional views. For instance, where the roll 46 is first received between the former-plate and drum the sectional view Fig. 10, taken on line c of Fig. 9 will show the shallowness of the concave at this point, and the sections taken on lines d, e and f of said Fig. 9 illustrate how the depression gradually varies in taper until the full curve at f is reached which continues to the lower end of the plate. In other words said former-plate 34 is of progressively-decreasing radius transversely thereof, the greatest radius being at or near the entering end of said plate and said radius decreasing toward the discharge end of said plate.

In forming a roll of tapered form, which must, of course, vary in diameter throughout its length, different surface-speeds of the article being molded by the drum and former-plate must be taken into consideration, and the drum, being of large diameter also has a surface speed which constitutes an element of the problem encountered in the production of perfect work. Due to those conditions it is obvious that the molding of the loaf to taper-form must be gradual, and hence the arc of the concave must progressively vary until the full curve illustrated by Fig. 13 is reached. Furthermore this former-plate must be of the precise length required to produce perfect work, for if such length should be exceeded, a further molding action will twist or spiralize the ends of the roll or loaf, thus impairing its appearance and affecting its salable qualities. In the present instance, and referring to the diagram Figs. 18 and 19, the roll of dough is shown passing over the former-plate and in process of a reducing-action by said plate and drum. From these figures it will be seen that for example, the thicker intermediate parts of the body of the roll of dough will traverse the arc of the forming-plate in about three rotations or fractions thereof, while to secure a rolling contact of the tapered extremities, over the same arc, with no slippage, it would be necessary for them to rotate approximately eight times, but as a matter of fact they make the same number of rotations as the largest diameter of the loaf, therefore, a slippage gradually increasing toward the tapered extremities of said loaf must take place, and if this action were long continued the objectionable twisting before mentioned would result. In the present machine the former-plate is of a length conforming to about one-fourth of the circumference of the periphery of the drum, and although this proportion as regards the circumference of the drum may be varied within certain limits, the length of the plate should not much exceed the proportions given, for if it does it is found by practical experience that the ends of the roll will be twisted or spiralized as above stated, this action being due beyond the point mentioned to the rapid axial rotation of said roll of dough.

In Fig. 17 the curling and sheet-forming devices are the same as indicated in the former figures but a concave forming plate 48 extending over about half the circumference of the roll is provided, said plate being adjustable by a screw 49, and merging into a delivery chute 50. In this form of the invention the coil 46 of dough is rolled into a cylindrical loaf 51, as shown in Fig. 16, and the generic features of the invention with relation to said modification have relation only to the sheet-forming and curling devices.

In practice, the periphery of the drum is usually covered with cloth or other textile-material (not shown) and a scraper-plate 52 for removing any adhering material from the drum is employed in both forms of the machine, as shown in Figs. 1, 2, 3 and 17.

In the operation of the invention a batch of dough is first placed in the hopper 24 and drops by gravity therefrom upon the periphery of the drum, and said drum rotating in the direction of the arrow, and in conjunction with the roll 25 reduces the mass to sheet-form, adherence of material to the roll 25 being prevented by the stripper-plate 26. As the sheet advances with the drum it encounters the ratchet or toothed roller 31, is by it deflected in its course, and is carried by the teeth of said roller (the latter rotating in the direction of the drum) upward until the end of the sheet engages the yielding curler-plate 33 when the end is bent rearward or to the right, and the coil is started, the curler-plate yielding, as shown in Fig. 3, as said coil is formed and finally the complete coil 46 illustrated in Fig. 15 drops from the space between the curler-plate and drum into the chamber open at its ends produced by the former plate and said drum, when the rolling or kneading operation commences, and that finally a symmetrical roll with true tapered ends is the result as illustrated in Fig. 14.

It will be observed by referring to Fig. 4 of the drawings that the plate 34 is of less width than the width of the periphery of the drum, and that, therefore, an open-ended space permitting free elongation of the roll of plastic-material is thus provided.

In the modification illustrated in Fig. 17 the sheet-forming and curling-devices are the same as in the preferred form of the invention, and the cylindrical roll illustrated in Fig. 16 is the result.

Changes may be made in the various elements of the machine, the invention not being limited to the precise devices illustrated and described, nor is it limited to the drum specified as coacting with the former-plate to produce tapered rolls, for other devices may be substituted for said drum without departure from the invention.

Having thus described the invention what we claim is:

1. The combination of a reducing roller and drum coöperative to reduce a mass of plastic material to sheet form, a roll rotative in the same direction as the drum, a curler-plate for curling the sheet into coil form, said roll serving to present the sheet to the curler plate, and a former plate coöperative with and spaced apart from the drum, said two last mentioned parts serving to reduce the coil to finished form.

2. The combination of a reducing roller and a drum coöperative to reduce plastic material to sheet form, a toothed roll rotary in the same direction as the drum, a curler-plate said toothed roll serving to positively present the sheet to said curler-plate and the latter being adapted to curl or coil the sheet, and a former-plate spaced from and coöperative with said drum, the space between said former plate and drum being adapted to receive the curled or coiled body of plastic material and the former plate and drum serving together to make said curled or coiled body into finished form.

3. The combination of a rotary drum, a reducing roller coöperative with said drum to reduce a mass of plastic material to sheet form, a yieldable curler-plate, a roller to receive said sheet and to present the same to said curler-plate, and a former-plate coöperative with and partially surrounding said drum.

4. The combination with the drum; a reducing roll that coöperates with the drum and means independent of the drum for curling the material.

5. The combination with a reducing roll and a drum that coöperates therewith, of means for forming the mass into a coil, the said means operating independently of the drum, and another means for reducing the coiled mass.

6. In combination with a shaping drum, a reducing roll that coöperates with the receiving portion of the drum, a combined compressing and shaping member that coöperates with the discharge end of the drum, means for curling the material independent of the drum after it leaves the reducing roll, and before it enters the combined compressing and shaping member and reducing it to a coil.

7. In combination with a rotatable shaping drum, a reducing roll and a combined compressing and shaping member that coöperates with the shaping drum, of an interposed mechanism operable independent of the aforesaid mechanisms for receiving the material from the drum, after it passes the reducing roll and returning the material to the drum and to the compressing and shaping member at the entrant end thereof.

8. In combination with a means for reducing the plastic material to a sheet and advancing such sheet, said means including a shaping drum and a coacting roll, and means coöperating with the drum for finally shaping and compressing the plastic body, of means interposed between the reducing means and the finally shaping and compressing means to receive the plastic body, and curl it into coils independently of the shaping drum and then returning the coiled sheet to the shaping drum to enter the finally shaping and compressing devices.

9. The combination with means for advancing a sheet; of a curling means comprising a roller, a spring metal guard plate that coöperates therewith and means for imparting motion to the roller in a direction opposite the direction of movement of the sheet, said guard plate being secured at its delivery plate only.

10. In combination with means for reducing a plastic body to a sheet, and advancing it; of a curling means, comprising a roughened faced roller rotatable in a direction opposite the movement of the sheet, and a guard plate that coöperates with the roller to form a coiling passage.

11. The combination with a drum, a roller that coöperates therewith, a bottomless hopper mounted on the drum, in advance of the roller, a scraper for engaging the drum in advance of the hopper, a scraper for engaging the roller, and a curling means that operates independent of the drum and engages the plastic sheet as it advances from between the drum and roller.

12. The combination with the drum, and the reducing roller; of a roughened faced roller and a guard plate concentric with the roller, said plate being secured at its discharge end only.

13. The combination with means for advancing a sheet; of a curling means comprising a roller, a spring metal guard-plate that coöperates therewith and means for imparting motion to the roller in a direction opposite the direction of movement of the sheet said guard plate being secured at its delivery end only.

In testimony whereof we affix our signatures in presence of two witnesses.

EDWARD T. PARSONS.
WILLIAM J. O'NEIL.

Witnesses:
C. A. KIRK,
GEO. E. GOWDY.